Figure 1:
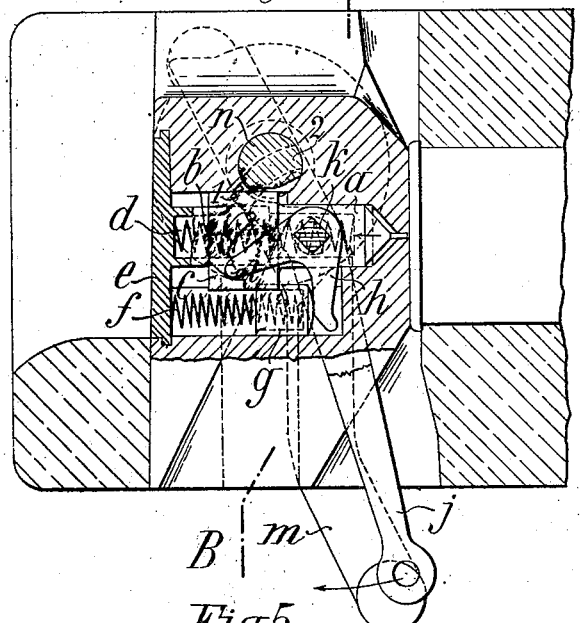

No. 704,866. Patented July 15, 1902.
K. DEINLEIN.
FIRING GEAR FOR ORDNANCE.
(Application filed Dec. 26, 1901.)

(No Model.) 4 Sheets—Sheet 1.

Witnesses:

Inventor
Karl Deinlein
By James L. Norris
Atty

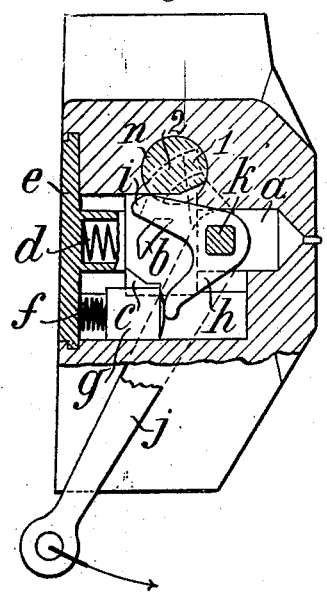
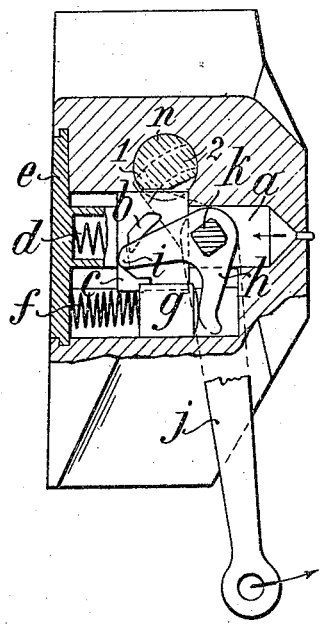
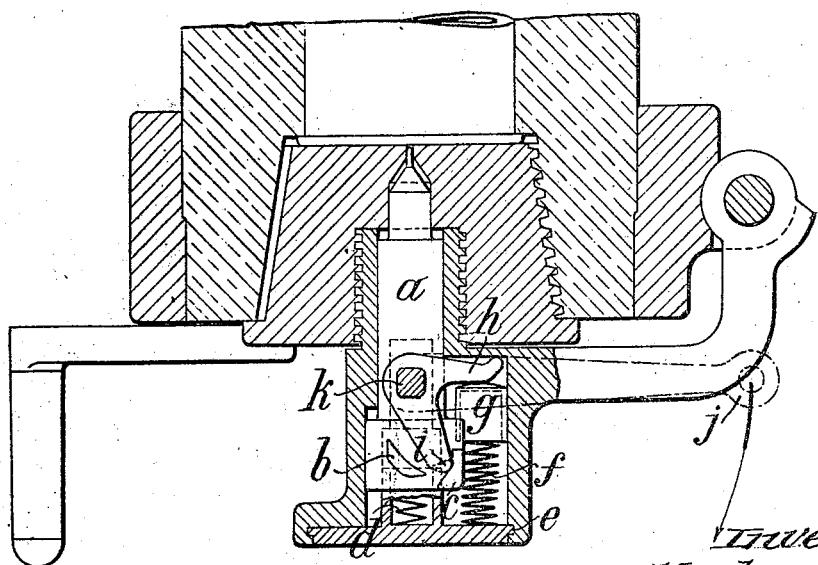

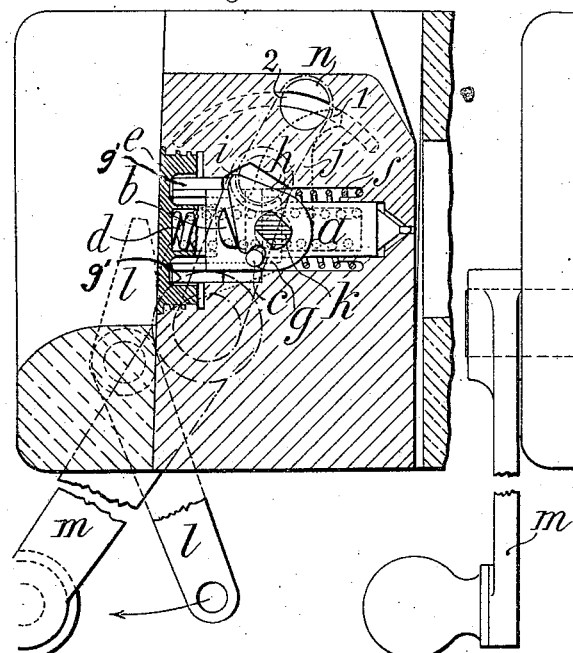
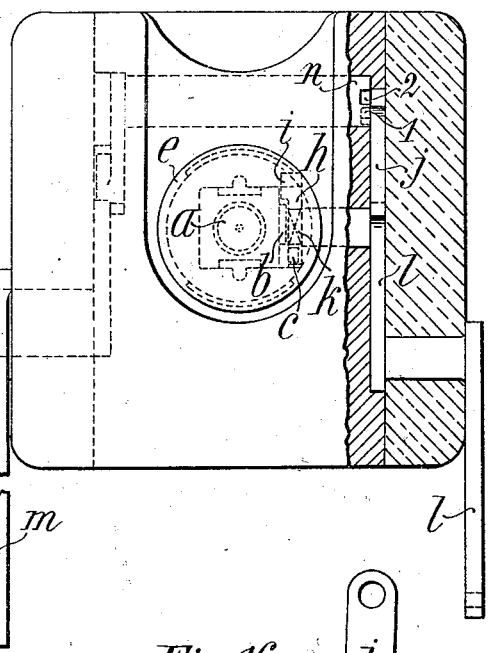
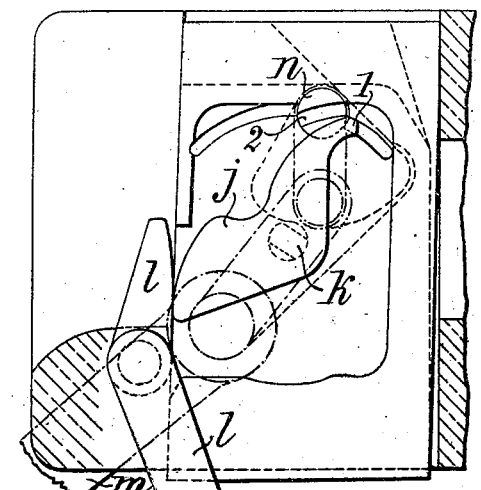
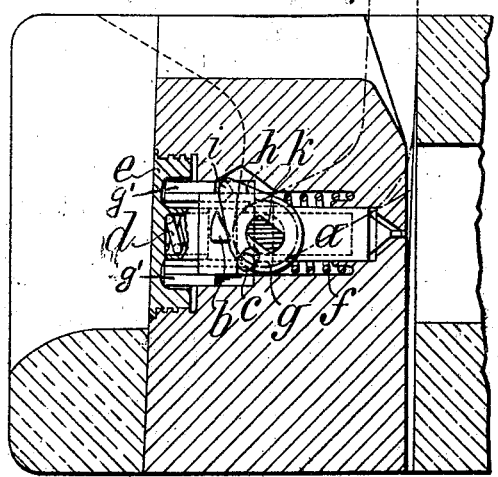

No. 704,866. Patented July 15, 1902.
K. DEINLEIN.
FIRING GEAR FOR ORDNANCE.
(Application filed Dec. 26, 1901.)
(No Model.) 4 Sheets—Sheet 4.
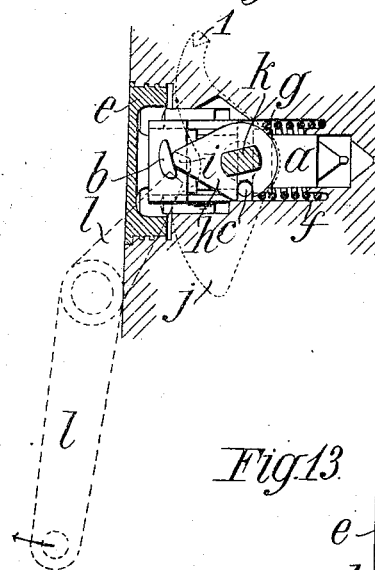
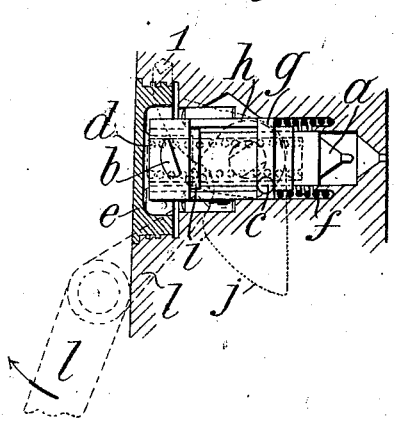
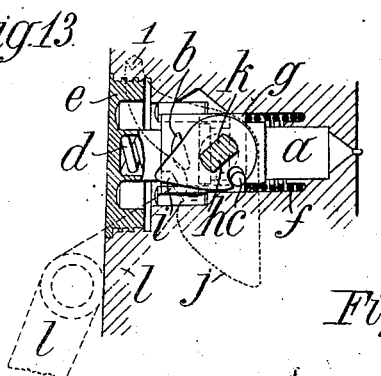
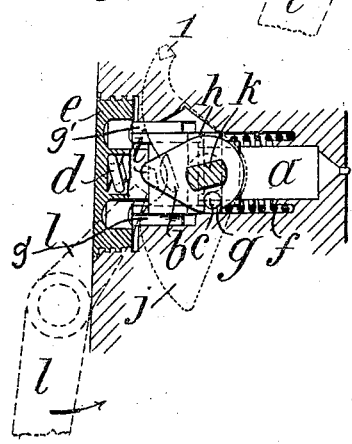
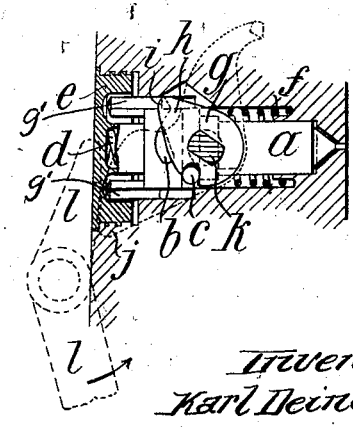
Inventor
Karl Deinlein

UNITED STATES PATENT OFFICE.

KARL DEINLEIN, OF PILSEN, AUSTRIA-HUNGARY, ASSIGNOR TO SKODA-WERKE ACTIENGESELLSCHAFT IN PILSEN, OF PILSEN, AUSTRIA-HUNGARY, A FIRM.

FIRING-GEAR FOR ORDNANCE.

SPECIFICATION forming part of Letters Patent No. 704,866, dated July 15, 1902.

Application filed December 26, 1901. Serial No. 87,261. (No model.)

*To all whom it may concern:*

Be it known that I, KARL DEINLEIN, a subject of the Emperor of Austria-Hungary, residing at Pilsen, in the Province of Bohemia, in the Empire of Austria-Hungary, have invented certain new and useful Improvements in Firing-Gear for Ordnance; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to means for firing guns, according to which on pulling the trigger the striker-spring is first compressed and then released for the purpose of shooting forward the striker, but which automatically returns to its initial position after the trigger has been pulled, whether the charge has been fired or not, so that the firing-gear can be again operated without its being necessary to manipulate or interfere with the breech-block.

In firing-gear according to this invention a cocking-lever adapted to be operated by the trigger acts upon the striker, whose movement in the breech-block is suitably guided, and on the striker-spring, which is not in stress when in its position of rest. The cocking-lever is influenced by a spring that bears against the back cover of the firing-gear and is adapted to maintain it in position in the breech-block and also to hold the striker ready for firing. When the trigger is pulled, the cocking-lever first withdraws the striker and compresses the two springs, whereupon the striker is released and is caused by means of its spring to move forward. The second spring comes simultaneously into action and returns the released trigger to its initial position, whereby the cocking-lever and the striker are also returned to their original positions, so that the firing-gear is again brought into position for use. The two springs may be either parallel to each other or one may be concentrically inserted in the other, and the cocking-lever may either be moved directly by the trigger or by means of a separate lever acting upon the trigger.

To obviate risk of firing the gun when the breech-block is not completely closed, the trigger is provided with a projection which can enter a groove formed in a bolt adapted to be rotated by a cam-lever only when the breech-block is completely closed and the cam-lever is in the position corresponding thereto, and thereby enable the firing device to be moved.

Figure 2:
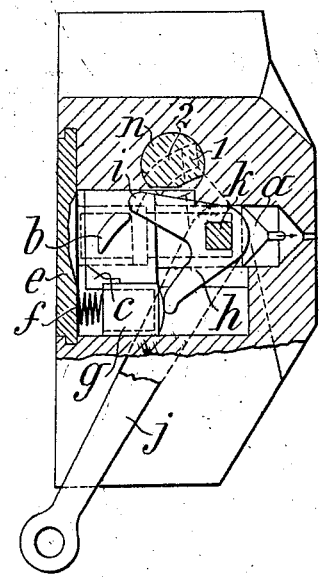
Figure 5:
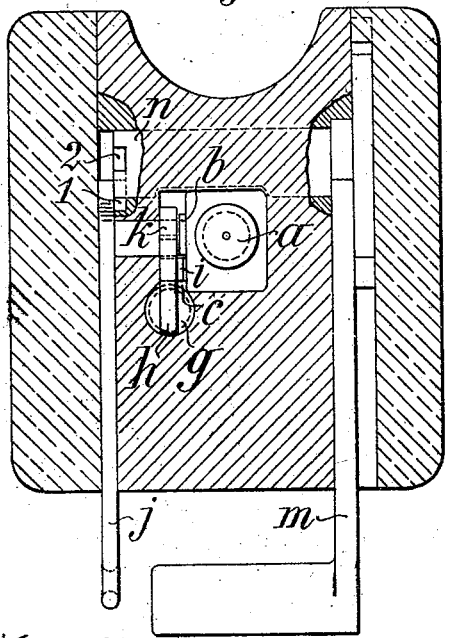
Figure 6:
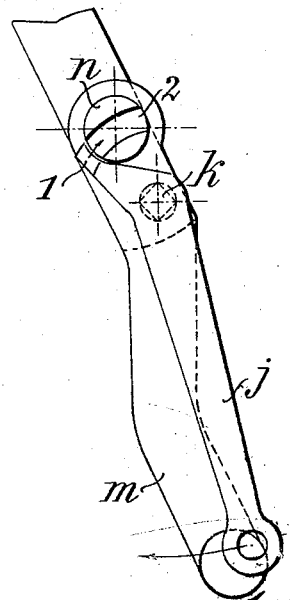

Figures 1 to 5 illustrate an example of wedge-shaped breech-block provided with firing-gear according to this invention. Fig. 1 is a longitudinal section through the rear end of the gun and the breech-block, showing the parts in the positions they occupy when at rest. Figs. 2, 3, and 4 are longitudinal sections through the breech-block, showing successive positions of the parts when in operation. Fig. 5 is a cross-section through the breech-block on the line A B of Fig. 1. Fig. 6 is a side elevation of the safety means, and Fig. 7 is a horizontal section of a screw breech-block and rear end of a gun provided with firing-gear according to this invention. Figs. 8 to 15 show another example of such firing-gear also arranged to suit a wedge-shaped breech-block. Fig. 8 is a longitudinal section of the rear end of the gun and the breech-block, showing the parts in the position they occupy when at rest. Fig. 9 is a rear elevation, partly in section; and Fig. 10 shows in elevation the firing and safety devices, while Figs. 11 to 15 are longitudinal sections showing the parts in successive positions they occupy during operation. Fig. 16 is a longitudinal section of a wedge-shaped breech-block and firing-gear in which the trigger-lever also forms the firing-lever.

In the example shown in Figs. 1 to 5 the striker *a* is adapted to slide longitudinally in a suitable recess formed in the breech-block, but is not rotatable. There projects into the box of the striker a cylindrical hollow extension of the supporting-plate *e*, which is inserted into the breech-block and held therein by means of a bayonet-joint. This plate entirely closes the rear portion of the re͏͏ ͏s in the breech-block which contains the firing-gear. In the space formed in the interior of the striker and the extension of the supporting-plate there is placed a striker-spring $d$, the length of which is such that the point of the striker $a$ is located slightly behind the front surface of the breech-block when at rest, and the ends of the striker-spring bear without pressure, respectively, on the striker and the supporting-plate, Fig. 1.

For the purpose of cocking the striker $a$ cocking device $h$ is provided, which is connected to the square pin $k$ of the trigger $j$, which is mounted on the breech-block. This cocking device is formed as a bell-crank lever and is subjected to the pressure of a spring $f$, which is provided with a sleeve $g$ and of which the other end bears on the plate $e$. This spring is slightly compressed in the position shown in Fig. 1, so that it secures on the one hand the bayonet-joint of the supporting-plate $e$ and on the other hand presses against the sleeve $g$, thereby maintaining the cocking device and the trigger in the positions shown in Fig. 1. A projection $i$ at the side of the cocking device presses against the inclined withdrawing projection $c$ on the striker, and therefore holds the striker in its rearward position. The loaded gun can therefore be subjected to shocks—for example, while traveling—without any risk, as the striking-spring when in this position exerts no pressure on the striker, and the striker in moving forward would have to overcome the increasing pressure of the spring $f$, that acts on the cocking device.

For the purpose of firing the trigger $j$ is moved backward, thus turning the cocking device $h$. This at first compresses only the spring $f$—i. e., until the cocking projection $i$ bears on the forward-inclined surface of a part $b$, that projects laterally from the striker. When the cocking device rotates further, the projection $i$ bears on the projection $b$ and causes the striker to be drawn back and the striking-spring to be compressed, while the other spring $f$ is still more compressed. As soon as the projection $i$ has passed the projection $b$, as indicated in Fig. 2, the striker-spring $d$, which has till then been completely compressed, comes into action on the striker, which is released at this moment and caused to spring forward into the position indicated in Fig. 3, in which position the striker comes into contact with the cartridge. If the trigger $j$ be now released, the spring $f$, acting upon the cocking device, moves it back, and the trigger connected therewith is moved forward until the projection $i$ on the cocking device bears against the withdrawing projection $c$, as shown in Fig. 4. Further pressure of the spring $f$ causes the projection $i$ to bear on the inclined surface of the projection $c$, and thereby draw the striker into the position of rest, Fig. 1, in which position either the breech can be opened or a fresh shot can be fired, in which latter case the before-mentioned operations are repeated.

In order to render discharging possible only when the breech is completely closed and to prevent the operation of the firing-gear in any other position of the breech-block, there is provided a safety device, as shown in Figs. 5 and 6, which comprises a projection 1 on the trigger $j$ and a groove 2, cut in the pivot $n$ of the cam-lever $m$, these parts being adapted to engage with each other only when the breech-block is completely closed, and therefore only when the cam-lever is in the position corresponding thereto, so that the trigger $j$ can then be moved.

The repeating firing-gear hereinbefore described can be used also in a similar manner with screw breech-blocks, as shown in Fig. 7. The construction and operation of this arrangement will be obvious from what has been stated above.

In the example shown in Figs. 8 to 16 the striker $a$, which is movable in an axial direction, but is prevented from rotating, contains the uncompressed striking-spring $d$, in conjunction with the sleeve-like extension of the supporting-plate $e$ and is provided with a sleeve $g$, which is guided in the breech-block and on which the spring $f$, that effects the return movement of the trigger $j$, acts. The spring $f$ is arranged concentrically with the striking-spring and surrounds the striker $a$. The cocking device $h$, which is connected with the trigger-lever by means of the squared pin $k$, is in the form of a cam and is provided with a notch in addition to the projection $i$, the projection $c$ of the sleeve $g$ extending into the said notch. When the firing-gear is in its normal position, Fig. 8, the spring $f$ by means of bars $g'$, projecting from the sleeve, prevents the supporting-plate $e$ from being rotated and falling out and also holds the striker in its normal position. The trigger $j$ is operated in this case by drawing the firing-lever $l$, which is pivoted independently of the breech-block on the rear end of the gun, and the cam $h$ is thus rotated in such a way that its projection $i$, in conjunction with the projection $b$, acts on the striker in the manner hereinbefore described. The striker is consequently pushed backward and at the same time the sleeve $g$ is pulled forward by the projection $c$ on the cam, so that the spring $f$ is still further compressed, Fig. 11.

When the striker and the sleeve are in their extreme end positions, Fig. 12, the projection $i$ releases the projection $b$ and the striker can spring forward and enter the cartridge in consequence of the forward position of the sleeve $g$, Fig. 13.

When the firing-lever $l$ is released, so that the trigger $j$ is also released, the spring $f$ presses the sleeve $g$ backward, Fig. 14, and by means of the projection $c$ this sleeve rotates the cocking device $h$ and also moves the levers $j$ and $l$ into their initial positions, the striker being drawn back behind the front surface of the breech-block in consequence of the pressure of the sleeve upon it, Fig. 15, so that all the parts of the firing-gear are returned unto their positions of rest, Fig. 8, and the guide-bars of the sleeve g can come into engagement with notches on the supporting-plate e (shown in Fig. 15) for the purpose of securing the latter.

When the breech-block is insufficiently closed, firing is prevented by means of the projection 1, Figs. 9 and 10, which is mounted on the trigger j and can enter a groove 2 on a pivot n, connected to the cam-lever by means of two links, as soon as the breech-block is completely closed and the cam-lever assumes the position corresponding thereto.

The trigger j can also be formed as a firing-lever, as shown in Fig. 16.

The form of construction of the firing-gear according to Figs. 8 to 15 can be used, in a similar manner to that according to Figs. 1 to 5, also for screw breech-blocks.

I claim—

1. In a firing mechanism for ordnance, the combination with a breech-block, of a striker arranged therein, a spring for operating said striker, a projection carried by the striker, a cocking device consisting of a bell-crank lever having one arm thereof during its passage in one direction engaging said projection to compress the spring to cause the operation of the striker when the said arm has passed out of engagement with said projection, means for oscillating said cocking device, a second projection carried by the striker and adapted to be engaged by the said arm in its passage in the opposite direction for returning the striker to its position of rest, and means engaging the cocking device for returning the same to its normal position and causing the said arm to engage with the said second projection.

2. In a firing mechanism for ordnance, the combination with a breech-block, of a striker arranged therein, a spring for operating said striker, a projection carried by the striker, a cocking device consisting of a bell-crank lever having one arm thereof during its passage in one direction engaging said projection to compress the spring to cause the operation of the striker when the said arm has passed out of engagement with said projection, means for oscillating said cocking device, a second projection carried by the striker and adapted to be engaged by the said arm in its passage in the opposite direction for returning the striker to its position of rest, means engaging the cocking device for returning the same to its normal position and causing the said arm to engage with the said second projection, and mechanism for preventing the operation of the striker until the breech-block is completely closed.

3. In a firing mechanism for ordnance, the combination with a breech-block, of a striker arranged therein, a spring for operating said striker, a projection carried by the striker, a cocking device engaging said projection during its passage in one direction and adapted to compress the said spring to cause the operation of the striker when the cocking device has passed out of engagement with the said projection, means for oscillating said cocking device, a second projection carried by the striker and adapted to be engaged by the cocking device in its passage in the opposite direction for withdrawing the striker and returning the same to its position of rest, and means engaging with the cocking device for returning it to its normal position and for causing the engagement of the cocking device with the second projection, substantially as described.

4. In a firing mechanism for ordnance, the combination with a breech-block, of a striker arranged therein, a spring for operating said striker, a projection carried by the striker, a cocking device engaging said projection during its passage in one direction and adapted to compress the said spring to cause the operation of the striker when the cocking device has passed out of engagement with the said projection, means for oscillating said cocking device, a second projection carried by the striker and adapted to be engaged by the cocking device in its passage in the opposite direction for withdrawing the striker and returning the same to its position of rest, means engaging with the cocking device for returning it to its normal position and for causing the engagement of the cocking device with the second projection, and mechanism for preventing the operation of the striker until the breech-block is completely closed, substantially as herein shown and described.

5. In a firing mechanism for ordnance, the combination with a breech-block, of a striker arranged therein, a guide for the said striker, a spring for operating said striker, a projection carried by the striker, a cocking device adapted to engage the said projection during its passage in one direction for compressing the spring to cause the operation of the striker when the cocking device has passed out of engagement with the said projection, a second projection carried by the striker, a spring arranged in the breech-block and adapted to be compressed during the operation of the cocking device in one direction and for causing the return of the cocking device to its normal position and for causing the cocking device to engage the second projection for withdrawing the striker to its position of rest, and means for operating said cocking device.

6. In a firing mechanism for ordnance, the combination with a breech-block, of a striker arranged therein, a guide for the said striker, a spring for operating said striker, a projection carried by the striker, a cocking device adapted to engage the said projection during its passage in one direction for compressing the spring to cause the operation of the striker when the cocking device has passed out of engagement with the said projection, a second projection carried by the striker, a spring arranged in the breech-block and adapted to be compressed during the operation of the cocking device in one direction and for causing the return of the cocking device to its normal position and for causing the cocking device to engage the second projection for withdrawing the striker to its position of rest, means for operating said cocking device, and mechanism for preventing the operation of the striker until the breech-block is completely closed.

In testimony that I claim the foregoing as my invention I have signed my name in presence of two subscribing witnesses.

KARL DEINLEIN.

Witnesses:
JOSEF BISMARCK,
ALVESTO S. HOGUE.